July 31, 1928. 1,679,311
A. S. KNOTT
AUTOMATIC ADVERTISING PROJECTING AND DISPLAY APPARATUS
Filed June 21, 1926 3 Sheets-Sheet 1

July 31, 1928.

A. S. KNOTT 1,679,311

AUTOMATIC ADVERTISING PROJECTING AND DISPLAY APPARATUS

Filed June 21, 1926     3 Sheets-Sheet 2

Inventor
A. S. Knott
Attorney

July 31, 1928.

A. S. KNOTT 1,679,311

AUTOMATIC ADVERTISING PROJECTING AND DISPLAY APPARATUS

Filed June 21, 1926  3 Sheets-Sheet 3

Inventor
A. S. Knott
By
Attorney

Patented July 31, 1928.

1,679,311

UNITED STATES PATENT OFFICE.

ADMIRAL S. KNOTT, OF COLUMBUS, OHIO.

AUTOMATIC ADVERTISING PROJECTING AND DISPLAY APPARATUS.

Application filed June 21, 1926. Serial No. 117,435.

My invention relates to improvements in that class of automatic stereopticon projection and display apparatus particularly adapted for out-of-door advertising work.

In my co-pending application, Ser. No. 56,457, filed Sept. 15, 1925, I have shown and described an apparatus which is constructed to rigidly support two co-operating stereopticon projectors in proper adjusted relation to optically project a traveling light border upon a screen and to simultaneously and intermittently project successive slides of an endless slide carrier upon the screen within the confines of the traveling border.

While devices of the class described in my co-pending application above referred to are designed for certain classes of out-of-door advertising work, it has been found extremely difficult for operators to make the proper adjustments of the co-operating projectors, under certain conditions, in order to effect a concentric alignment upon the screen of the border projected image and the intermittently projected image. Aside from the initial adjustment of separate co-operating projectors of this character, it has been found that, because of the conditions under which such machines are operated, and also due to the distortion of parts by expansion and contraction, under operating conditions, frequent re-adjustment of the various parts is required.

It is therefore the object of the present invention to eliminate the disadvantages above referred to and to produce, through the automatic operation of a single stereopticon projector, the desired combination of effects upon the projector screen in a novel and greatly improved manner.

A further object of my invention is to combine with a single intermittently operated stereopticon projector and its motor, an electric circuit flasher connected to be continuously operated with the projector by the motor, to alternately flash series of electric lamps arranged around the margin of the projector screen, and thereby produce an illuminated traveling border effect around an image projected upon the screen.

A further object of my invention is to provide a unitary control means for an incandescent lamp border arranged as a marginal portion of the projector screen and an automatic stereopticon projection apparatus focussed upon the screen which will operate at predetermined intervals to connect said elements to operate simultaneously.

A still further object of the invention relates to the improved details of construction of my combined machine, which co-operate to produce a simple and compact unit which is rigidly constructed to meet out-of-door conditions and which will operate economically and automatically with the minimum of attention.

Referring now to the accompanying drawings, which form a part of this specification, and on which similar reference characters indicate similar parts;

Figure 4:
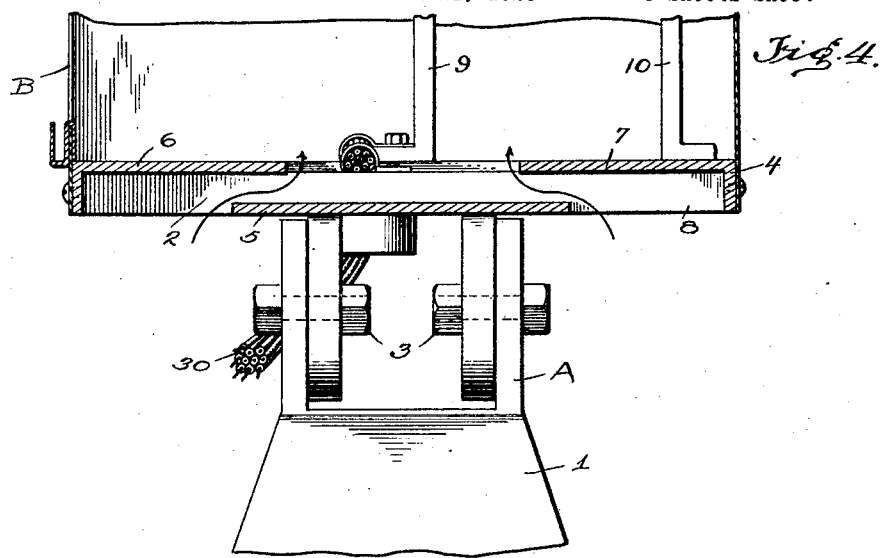
Figure 3:
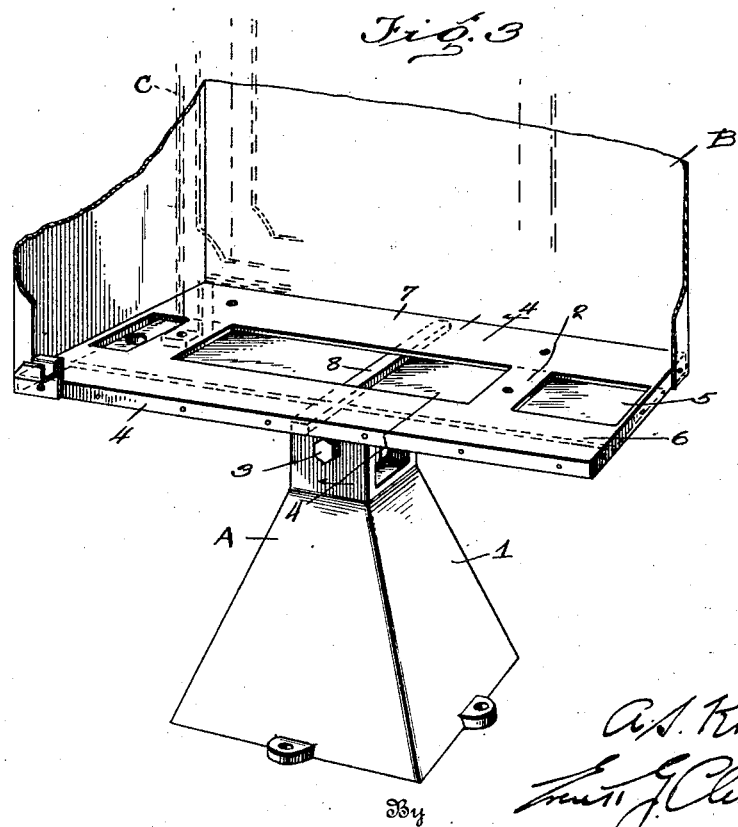

Fig. 3 is a perspective view of the adjustable support for my improved machine and its housing, with the housing shown partly in section and the machine parts removed and indicated diagrammatically by dotted lines to disclose the construction of the ventilated, tiltable flooring, and, Fig. 4 is a cross-sectional view taken on line 4—4 of Fig. 3 to illustrate the relation of parts of the floor casting to each other and also to the base casting.

In the drawings the parts indicated as A represent a support comprising a base casting 1, on which a tiltable ventilated floor casting 2 is adjustably mounted by any suitable means, such as bolts 3. The floor casting 2 is constructed to permit free circulation of air therethrough without permitting the entrance of water to the interior of a housing B, which is detachably secured to the marginal edge 4 of the floor 2. By reference to Figs. 3 and 4 it will be seen that the floor casting 2 consists of an integral rectangular frame 4 having longitudinally extending, vertically spaced web portions, 5, 6 and 7, and an intermediate transversely extending spacing and reinforcing rib 8. The web portion 5 which is connected to the lower edge of the ends, of the rectangular frame 4, and spaced from the sides of said frame, is tiltably connected to the base casting 1 by the bolts 3. Superimposed in overlapping relation with the web portion 5 are two transversely spaced web portions 6 and 7, which are connected at one side and each end with the upper edge of the ends and sides of the rectangular frame 4.

The ends of the rectangular frame portion 4 and the transversely arranged reinforcing rib 8, serve to integrally unite the several overlapping web portions 5, 6 and 7 in proper spaced relation to provide a zigzag ventilation course through the floor casting 2, as indicated by the arrows in Fig. 4.

Rigidly secured to the web portions 6 and 7 of the floor casting 2 is an automatic stereopticon projection apparatus C which comprises a pair of vertically supported frame castings 9 and 10, on which an endless slide conveyor 11 is mounted to traverse the optical axis of a projector 12, also carried by the frame castings 9 and 10. A bracket 13 is formed integral with the frame casting 9 and serves to rigidly support an electric motor 14 and a gear box 15, which houses reduction gearing shaft 16 driven by the motor 13, and the driven gear elements 17 and 18 of a Geneva gear movement, which are connected through synchronizing clutch elements (not shown), to intermittently drive the slide conveyor 11. All of the parts 9 to 18 are specifically described and claimed in my co-pending application above referred to, and, therefore, need no special description except as such parts enter into new combinations, as will be understood fom the following.

Adjustably mounted on the frame casting 9 is a bracket 19 having a shelf portion 20 on which an electric circuit flasher D is secured. The flasher D shown herein is known as a "mercury break flasher," but any other well known or approved flasher, capable of being continuously driven from the motor 14, could be substituted, provided it will operate to produce the results later to be described.

The mercury break flasher D comprises a pair of connected upright supports 21 and 22, bolted on the shelf 20 between which a series of spring pressed rocker arms 23 is journaled. A rotary shaft 24 journaled in the supports 21 and 22, carries a series of cam elements 25 which operate on the rocker arms 23 to alternately tilt a series of mercury circuit makers and breakers 26, adjustably mounted on said arms. A train of gears indicated as 27, 28 and 29 operatively connect the rotary shaft 24 with the motor driven reduction gearing shaft 16.

A series of electric circuit wires 30 connect the several mercury circuit makers and breakers 26 of the flasher D with a series of incandescent lamps 31, arranged around the marginal portion of a projection screen E.

Figure 1:
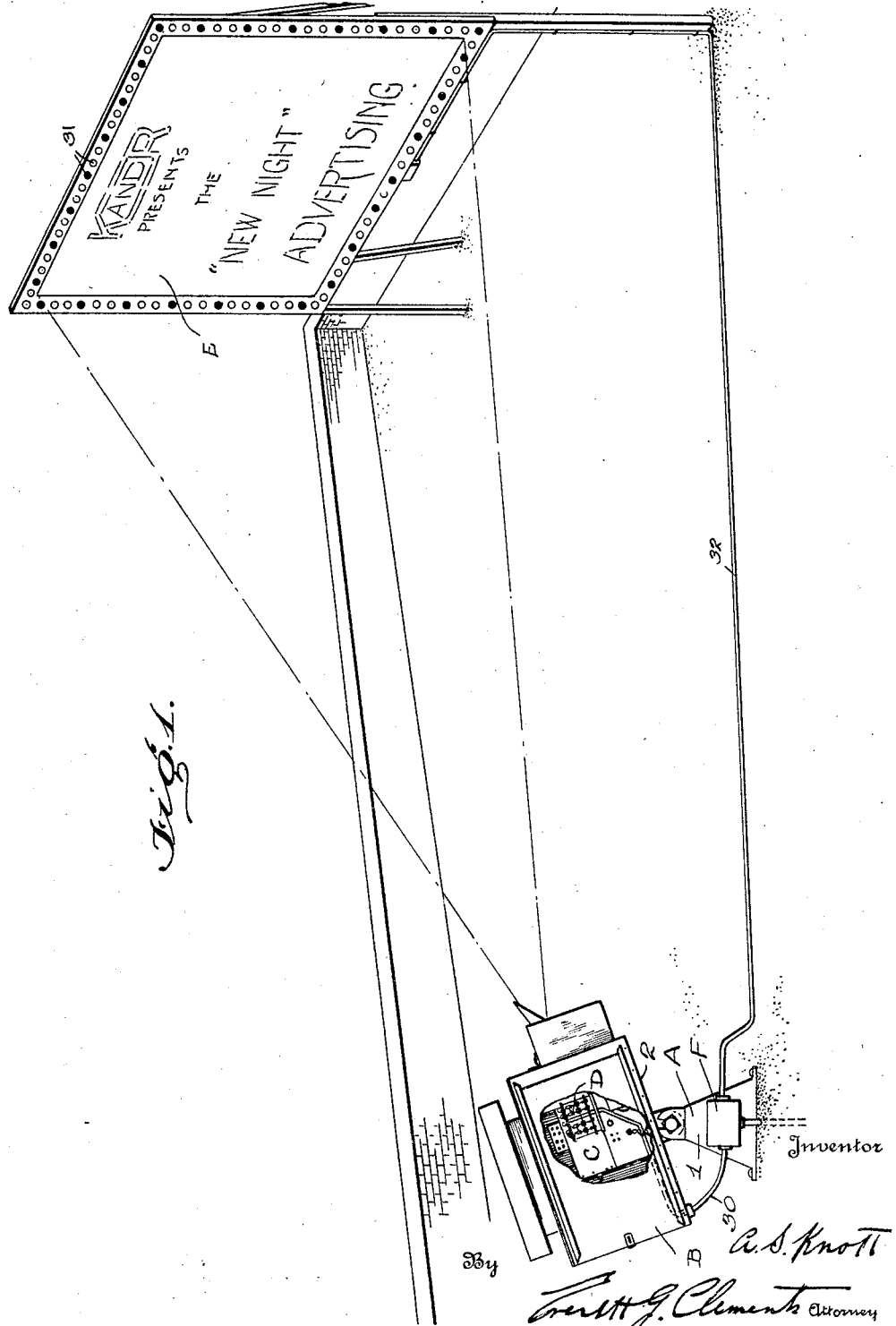
Fig. 1 is a perspective view of my improved automatic stereopticon projection and display controlling apparatus, shown partly in section to illustrate the relation of parts and their connection with parts of an associated projection screen.
Figure 2:
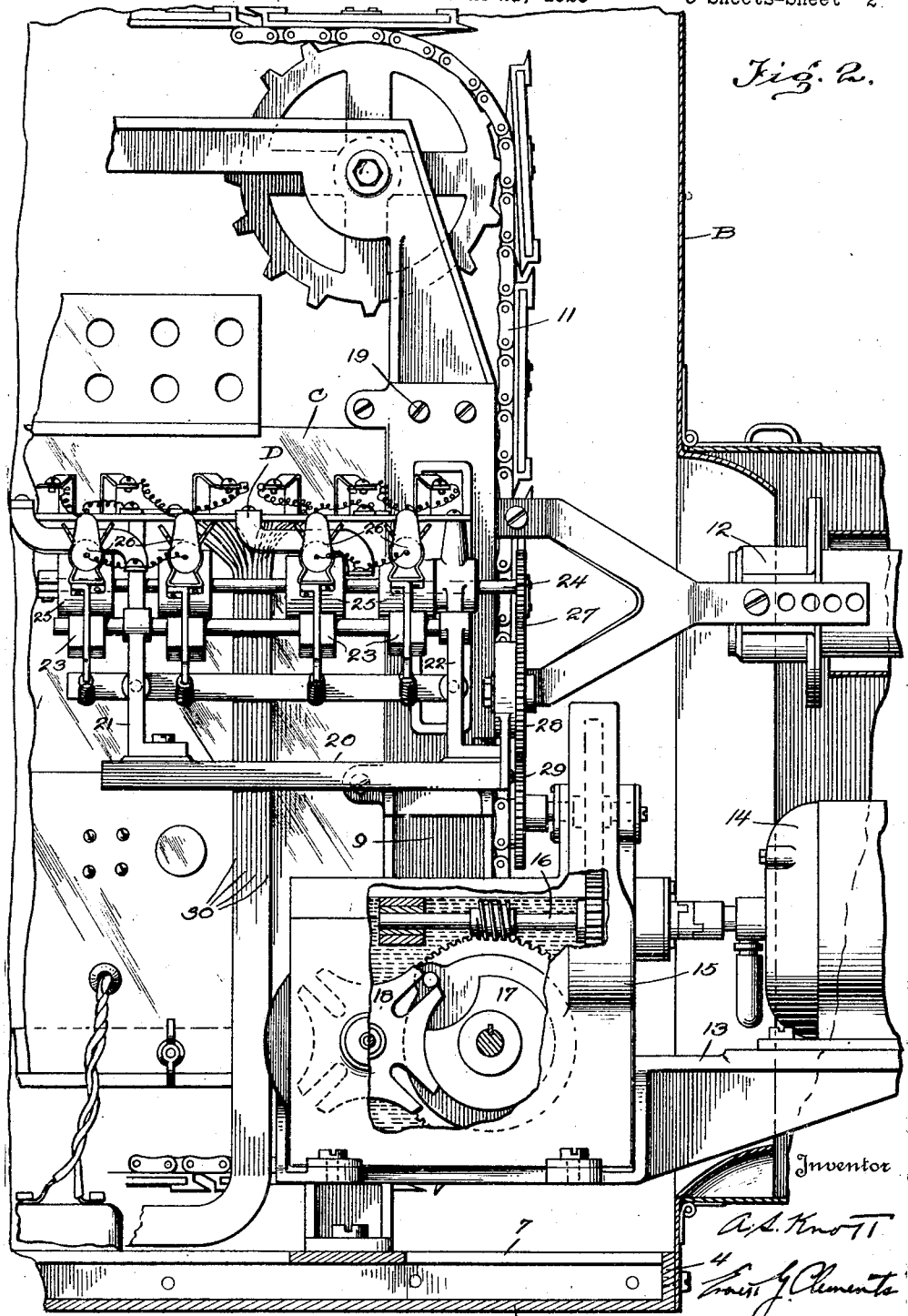
Fig. 2 is a side elevation of the front portion of the stereopticon projection machine, partly in section, showing the mounting of the several co-operating parts of the machine and the mercury circuit flasher connected to be driven with and by the machine.

The projector screen E, shown in Fig. 1, is constructed to represent the usual out-of-door sign board, around the marginal portion of which, I have provided an endless series or border of incandescent electric lamps 31, connected through suitable electric circuit wires 30, enclosed in a conduit 32, with the automatic intermittently operated stereopticon apparatus C.

In the operation of my improved stereopticon apparatus C, the electric motor 14 is connected to intermittently drive a movable slide carrier 11 to position successive slides into the optical axis of the projector 12, for projection on the screen or sign board E within the confines of the illuminated "chaser border" provided by the series of incandescent lamps 31. The motor 14 is also connected by suitable gearing to continuously drive an electric circuit flasher D mounted on the frame member 9 of the stereopticon apparatus C, which flasher is connected by suitable electric circuits 30 through an automatic master circuit controller F with the series or border of incandescent lamps 30 on the screen E, to flash alternate lamps of the series, in rotation, to produce a chaser or traveling border around the image simultaneously projected upon the screen.

In the automatic operation of the combined apparatus, a master circuit controller, such as a time clock switch, not shown, is enclosed within a suitable waterproof box F which is secured to one side of the base casing 1 immediately below the floor casting 2 of the stereopticon apparatus support.

What I claim is:

1. In combination with a projector screen, an incandescent lamp illuminated border arranged on the marginal surface of said screen, a flasher for controlling said incandescent lamp border, an automatic stereopticon projector focussed on said screen, and means for simultaneously controlling the operation of said flasher and said stereopticon projector.

2. In combination with an advertising apparatus of the automatic stereopticon projector type, including means for driving said apparatus, a projector screen on which said apparatus is focussed, a series of incandescent lamps arranged to provide an illuminated border on a marginal portion of the surface of said screen, electric circuits connecting said series of incandescent lamps with said apparatus, and means for flashing alternate lamps of said series comprising a circuit maker and breaker operatively connected with said means for driving said apparatus.

3. In combination with a projector screen, a series of incandescent lamps arranged to provide an illuminated border on a marginal portion of the surface of said screen, an automatic stereopticon projection apparatus adjustably mounted to project upon said screen, a housing for said projector apparatus, motor operated means for intermittently driving and locking said projector apparatus enclosed within said housing, an electric circuit flasher mounted within said housing and connected to be continuously driven by said motor operated means, and an electric circuit connecting said flasher and said series of incandescent lamps.

4. In combination with a stereopticon projection apparatus, a supporting frame on which said apparatus is mounted, a ventilated flooring on which said supporting frame is mounted, said flooring comprising a plurality of staggered spaced, overlapping, supporting members, vertical spacing members connecting said supporting members, and a housing enclosing said supporting frame and said stereopticon apparatus secured to said ventilated flooring.

5. In combination with a stereopticon projection apparatus, a tiltable support on which said apparatus is mounted, said support comprising a base casting, a ventilated flooring casting adjustably mounted on said base, said flooring casting consisting of vertically spaced supporting portions and intermediate spacing portions extending at substantially right angles to said supporting portions, and a housing enclosing said apparatus secured to one of the spacing portions of said flooring casting.

In testimony whereof I affix my signature.

ADMIRAL S. KNOTT.